United States Patent
Kawasaki et al.

(10) Patent No.: US 8,405,276 B2
(45) Date of Patent: Mar. 26, 2013

(54) MOTOR AND ELECTRONIC APPARATUS USING THE SAME

(75) Inventors: Hiroaki Kawasaki, Osaka (JP); Yuichi Yoshikawa, Osaka (JP); Atsuyoshi Koshiba, Hyogo (JP); Yasuhiro Inoue, Tottori (JP); Koji Kadowaki, Tottori (JP); Yasuo Kunishige, Tottori (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 13/005,803

(22) Filed: Jan. 13, 2011

(65) Prior Publication Data
US 2011/0175497 A1 Jul. 21, 2011

(30) Foreign Application Priority Data

Jan. 18, 2010 (JP) .................................. 2010-007714

(51) Int. Cl.
*H02K 1/06* (2006.01)
(52) U.S. Cl. ................................................ 310/216.074
(58) Field of Classification Search ................. 310/216.001–216.137
See application file for complete search history.

(56) References Cited

U.S. PATENT DOCUMENTS

| 5,604,389 A * | 2/1997 | Nitta et al. ................... 310/67 R |
| 7,439,642 B2 * | 10/2008 | Chen et al. ................... 310/68 R |
| 2006/0197402 A1 * | 9/2006 | Gomyo et al. ................ 310/216 |
| 2010/0219714 A1 * | 9/2010 | Abe et al. ............... 310/216.048 |

FOREIGN PATENT DOCUMENTS

| JP | 09-285044 A | 10/1997 |
| JP | 2007-244004 A | 9/2007 |

* cited by examiner

*Primary Examiner* — Nguyen N Hanh
(74) *Attorney, Agent, or Firm* — Brinks Hofer Gilson & Lione

(57) ABSTRACT

The motor comprises a stator, a rotor, and magnets. The stator has a plurality of magnetic poles circumferentially arranged at first spaced intervals. The rotor is rotatably arranged in a position opposing to the stator. The magnets are arranged at second spaced intervals circumferentially on a surface of the rotor. The stator is formed by laminating plate materials, and a plurality of laminated plate materials at least including outermost layers of a laminated body thereof are bent in a direction substantially parallel to the magnet in order to form extended portions. And, when a magnet opposed area of pole tip portion being closest to a magnet including the extended portion is S, and a sectional area of magnetic pole is A, then area ratio (S/A) fulfills the relation of $4.8 > (S/A)$.

7 Claims, 5 Drawing Sheets

MOTOR AND ELECTRONIC APPARATUS USING THE SAME

RELATED APPLICATIONS

This application claims priority under 35 U.S.C. §119 to Japanese Patent Application No. 2010-007714 filed on Jan. 18, 2010, the entire content of which is hereby incorporated by reference.

FIELD OF THE INVENTION

The present invention relates to a motor and electronic apparatus using the same, and particularly, to a stator of the motor.

BACKGROUND OF THE INVENTION

In an electronic apparatus, a laser printer for example, a paper feed roller (driven component) disposed in a main body case is connected to a motor, and the paper feed roller is rotated by driving the motor to feed the paper to a specified portion.

The motor generally used is a brushless DC motor. The motor comprises a stator having a plurality of magnetic poles arranged circumferentially at first spaced intervals along the outer periphery, and a rotor arranged along the outer periphery of the stator. And, structurally, magnets magnetized in a heteropolar fashion are circumferentially arranged at second spaced intervals along the inner periphery of the rotor.

Also, the magnetic pole of the stator is formed with an extended portion extended in a direction nearly parallel to a permanent magnet from the pole base portion, thereby enhancing the driving efficiency.

That is, the width (perpendicular to circumferential direction) of the permanent magnet is greater than the width (perpendicular to circumferential direction) of the pole base portion of the stator so that the rotor rotation is as proximate as possible to the magnetic detector element which magnetically detects the rotor rotation. And, an extended portion extended in a direction nearly parallel to the permanent magnet is formed from the pole base portion of the stator. In this way, the opposed area between the magnetic pole of the stator and the magnet is increased in order to enhance the driving force and driving efficiency. Similar technologies are disclosed for example in Unexamined Japanese Patent Publication H9-285044 (Patent document 1) and Unexamined Japanese Patent Publication 2007-244004 (Patent document 2).

As described above, in the case of a conventional motor wherein an extended portion extended in a direction substantially parallel to the permanent magnet is formed from the pole base portion of the magnetic pole of the stator, the opposed area between the permanent magnet of the rotor and the magnetic pole of the stator becomes larger. Accordingly, it has been generally considered that the driving force and driving efficiency can be enhanced.

However, according to the examination made by the present inventor, it has been found that it is not always possible to enhance the driving efficiency by only disposing an extended portion.

That is, in the case of a conventional motor formed with an extended portion as described above, the magnetic flux from the opposed permanent magnet increases with increase in elongation of the extended portion. In that case, magnetic saturation becomes liable to take place due to increase of the magnetic flux. As a result, there arises a problem that the driving force and driving efficiency cannot be enhanced.

SUMMARY OF THE INVENTION

The motor of the present invention comprises a stator having a plurality of magnetic poles circumferentially arranged at first spaced intervals, a rotor rotatably disposed in a position opposing to the stator, and magnets arranged at second spaced intervals circumferentially on a surface of the rotor. The stator is formed by laminating plate materials, and a plurality of laminated plate materials at least including outermost layers of the laminated body are bent in a direction substantially parallel to the magnet to form extended portions. And, when a magnet opposed area of the pole tip portion being closest to the magnet including the extended portion is S, and a sectional area of magnetic pole is A, then the area ratio (S/A) fulfills the relation of 4.8>(S/A).

In the above configuration, the motor of the present invention brings about such advantages that no magnetic saturation takes place in the magnetic circuit connected to the magnetic pole, and the driving efficiency is enhanced, and it is possible to realize higher efficiency and less consumption of power.

Further, the present invention includes an electronic apparatus comprising a main body case, a driven component disposed in the main body case and the motor connected to the driven component via a connecting mechanism.

Due to such a configuration, it is possible to realize an electronic apparatus having the feature of the motor of the present invention described.

DETAILED DESCRIPTION OF THE PREFERRED EMBODIMENTS

The preferred embodiments of the present invention will be described in the following with reference to the drawings.

Preferred Embodiment 1

Figure 1:
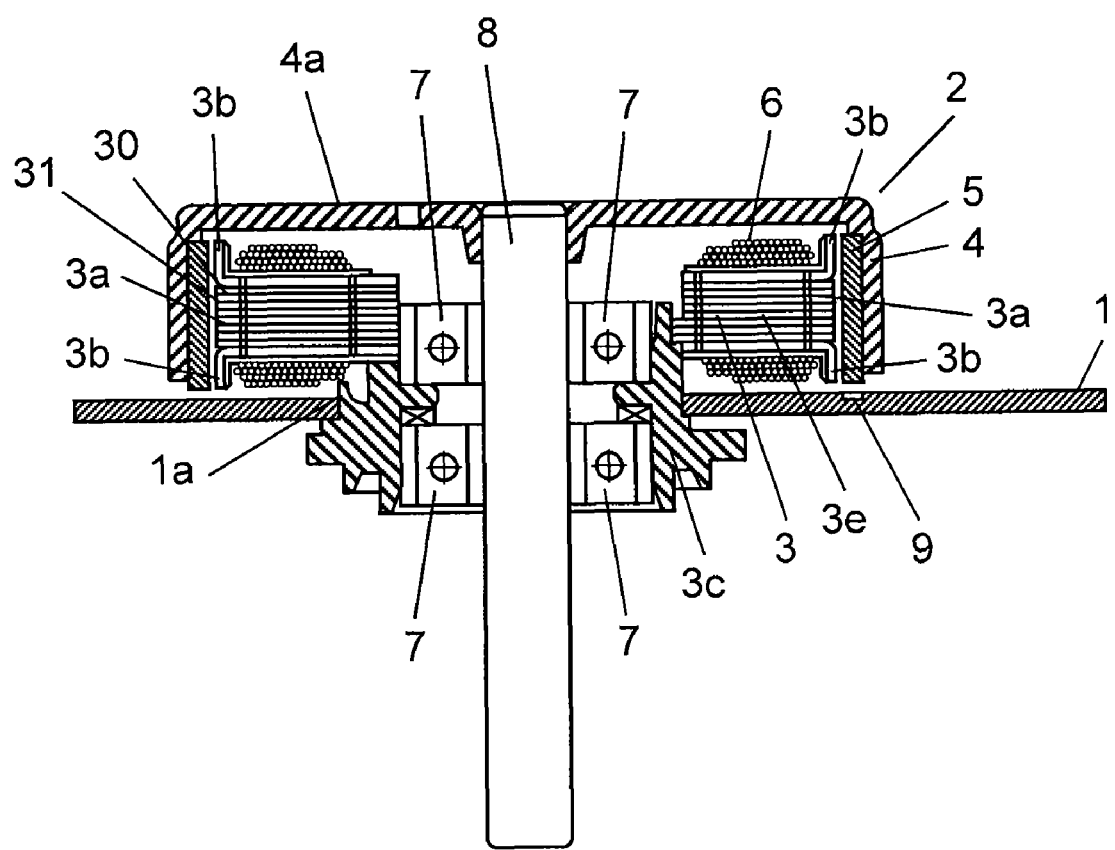
FIG. 1 is a sectional view of the motor in the preferred embodiment 1 of the present invention.
Figure 2:
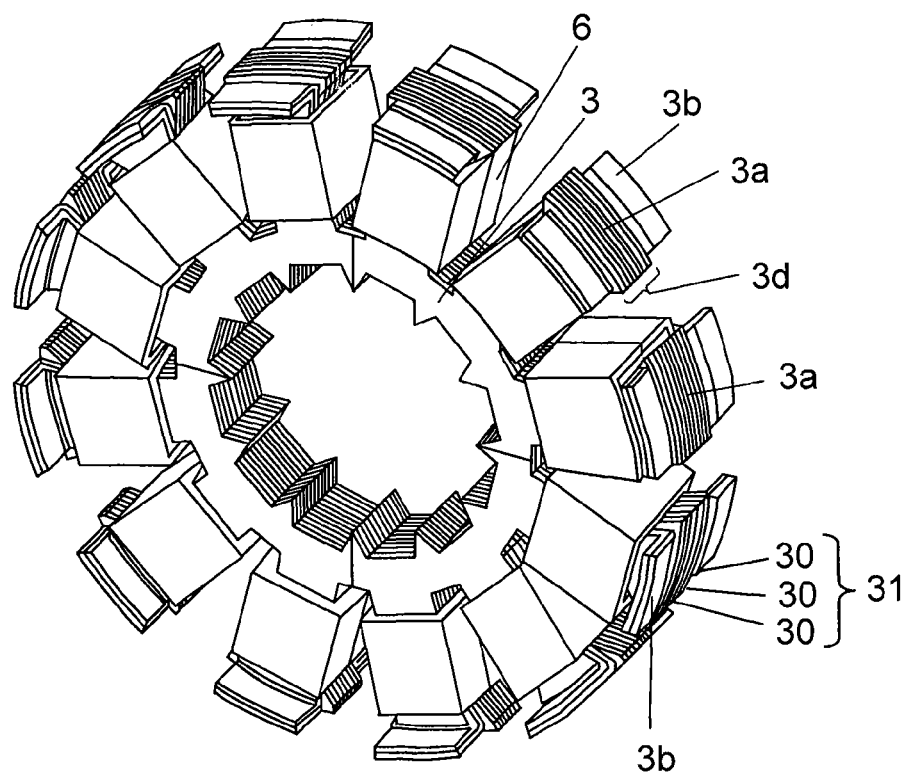
FIG. 2 is a perspective view of the stator of the preferred embodiment 1 of the present invention.
Figure 3:
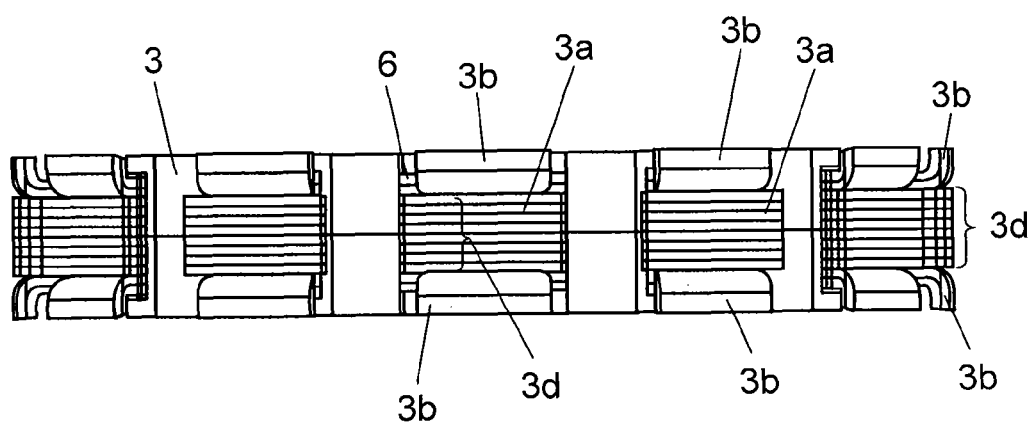
FIG. 3 is a front view of the stator of the preferred embodiment 1 of the present invention.

FIG. 1 is a sectional view of a motor in the preferred embodiment 1 of the present invention. FIG. 2 is a perspective view of a stator of the motor. FIG. 3 is a front view of the stator. Motor 2 is an outer rotor type brushless DC motor. An example of such outer rotor type motor is described in this preferred embodiment.

In FIG. 1, motor 2 is mounted on wiring board 1. Wiring board 1 mounted with such motor 2 is horizontally (or vertically) arranged in an electronic apparatus (laser printer for example).

Motor 2 comprises stator 3, and rotor 4 opposing in predetermined spaced relation to stator 3, as shown in FIG. 1 and FIG. 2. Stator 3 includes laminated body 31 (stator core) formed by laminating plate materials 30 (silicon steel plate for example). Rotor 4 is cylindrical in shape with its bottom opened, which is rotatably arranged along the outer periphery of stator 3.

A plurality of magnetic poles 3a corresponding to the number of magnetic poles are arranged at first spaced intervals along the outer periphery of stator 3, and magnetic coil 6 is wound on magnetic path 3e inwardly of each magnetic pole 3a as shown in FIG. 1 and FIG. 2.

Also, a plurality of magnets 5 which are permanent magnets are fixed circumferentially along the inner periphery of rotor 4. Magnets 5 are magnetized into N pole and S pole so as to be different in polarity between neighboring poles, which are alternately arranged at second spaced intervals.

That is, with AC power applied to coil 6, each magnetic poles 3a are alternately magnetized into N pole and S pole so that attraction and repulsion are generated between magnets 5 residing along the outer periphery thereof. And, it structurally creates the rotational driving force of rotor 4.

Also, stator 3 is fixed on wiring board 1 via holding portion 3c. A plurality of bearings 7 are disposed along the inner periphery of stator 3.

And driving shaft 8 is disposed vertically through the group of bearings 7, and the upper end of driving shaft 8 is secured to top surface 4a of rotor 4.

Accordingly, when AC power is applied to coil 6, and each magnetic poles 3a are alternately magnetized into N pole and S pole, thereby generating attraction and repulsion between magnets 5, then rotor 4 rotates about driving shaft 8. Also, the rotating force is transferred to the driven component via driving shaft 8.

Specifically, in the present preferred embodiment, the lower end of driving shaft 8 is extended under the wiring board 1 via through-hole 1a of wiring board 1. Gear (not shown) is mounted at the bottom of driving shaft 8, and gear box (not shown) is connected to the gear. In this way, a plurality of paper feed rollers (not shown) of a laser printer are rotated to feed the paper.

Also, Hall IC9 as a magnetic detector element is mounted on the surface (or on the underside) of a portion corresponding to the lower end of magnet 5 on wiring board 1. As is commonly known, the rotating speed and rotational extent (position) of rotor 4 are detected by Hall IC9 in order to perform the rotating speed (rpm) control.

Further, the lower end of magnet 5 is shaped and extended close to Hall IC9 so as to be positioned as close to Hall IC9 as possible. Also, in order to avoid the lower end of magnet 5 then extended downward from becoming unbalanced with respect to stator 3, the upper end of magnet 5 is also extended upward by same extent.

In conclusion, the vertical size of magnet 5 is increased. Accordingly, in this preferred embodiment, as shown in FIG. 1 to FIG. 3, each magnetic pole 3a of stator 3 is integrally formed with extended portions 3b extended upward and downward in a direction nearly parallel to magnet 5 from pole base portion 3d. That is, extended portion 3b is extended in the lengthwise direction of driving shaft 8 from each of the top and bottom of pole base portion 3d so as to be opposed to magnet 5 in a substantially parallel fashion.

Specifically, extended portions 3b are formed by bending the outer peripheries of the plate materials including the upper and lower surfaces (outermost layers) out of the plurality of laminated plate materials of laminated body 31 of stator 3 respectively upward and downward in a direction nearly parallel to magnet 5.

And, in this way, the outer peripheries of the upper and lower plate materials out of the plurality of laminated plate materials of stator 3 are bent upward and downward respectively in a direction nearly parallel to magnet 5, thereby forming extended portions 3b. Thus, the opposed area with respect to magnet 5 extended upward and downward becomes larger as shown in FIG. 1. As a result, the magnetic flux inflow from magnet 5 increases, causing the rotor 4 to be supplied with greater driving forces.

Further, in this preferred embodiment, area ratio (S/A) is the one established when the magnet opposed area of pole tip portion being closest to magnet 5 including extended portion 3b is S, and the sectional area of magnetic pole is A. The area ratio (S/A) is a ratio of magnet opposed area S to sectional area A. In the present preferred embodiment, stator 3 is formed by adjusting the bending height of the plate material, that is, the length of upward/downward extensions of extended portion 3b, so that the area ratio (S/A) fulfills the relation of 4.8>(S/A). Thus, the area ratio (S/A) is smaller than 4.8 in the present preferred embodiment.

Figure 4:
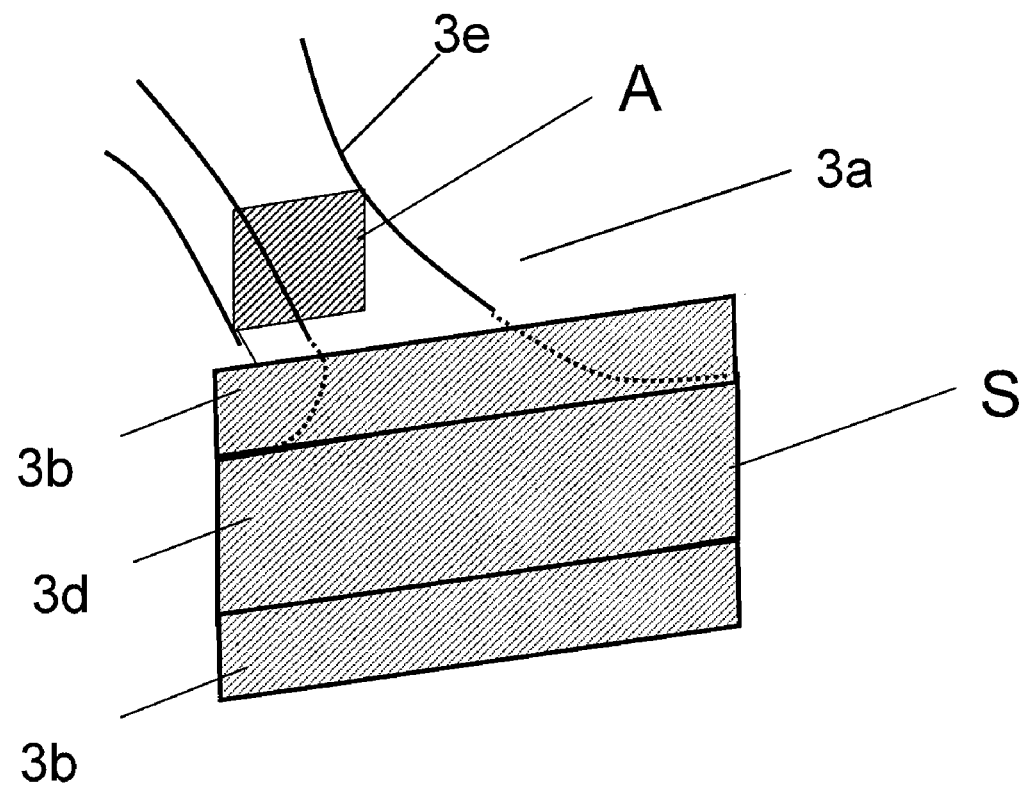
FIG. 4 shows an example of magnet opposed area S and magnetic pole sectional area A in the preferred embodiment 1 of the present invention.

FIG. 4 shows an example of magnet opposed area S and pole sectional area A. As shown in FIG. 4, magnet opposed area S is an area of the portion opposed to magnet 5 including pole base portion 3d and extended portion 3b. Also, sectional area A is an area of the magnetic pole section being parallel to the extending direction of driving shaft 8 as shown in FIG. 4. In case the area of the magnetic pole section varies depending upon the radial position, the least sectional area is sectional area A, as shown in FIG. 4. That is, sectional area A is a sectional area of the portion where magnetic path 3e is thinnest.

Figure 5:
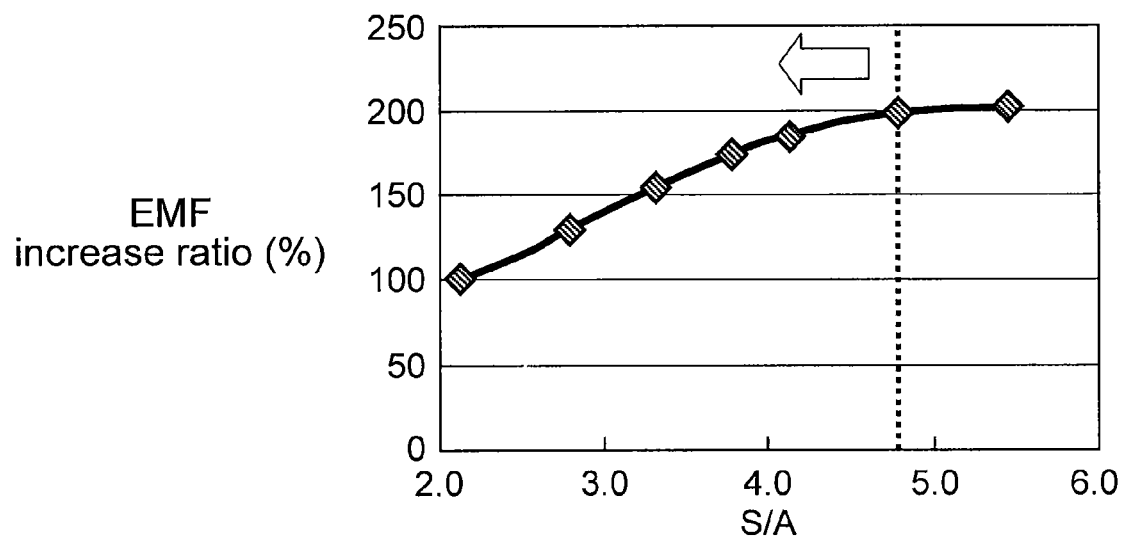
FIG. 5 is a diagram showing the variations of area ratio (S/A) and EMF in the preferred embodiment 1 of the present invention.

FIG. 5 is a diagram showing the variations of area ratio (S/A) and EMF (ElectroMotive Force). The horizontal axis shows the area ratio (S/A), and the vertical axis shows the increase ratio of EMF. The increase ratio of EMF corresponds to reference percent 100% in EMF when the area ratio (S/A) is 2.2. This is based on the fact that the area ratio (S/A) in the case of a common magnetic pole having no extended portions and with its pole tip portion expanded is in a range from 2.0 to 2.3. In the case of a 12-pole common magnetic pole as shown in FIG. 2, taking into account the strength and coil occupation rate, the area ratio (S/A) is preferable to be in a range from 2.0 to 2.3.

Also, shown in FIG. 5 is the result of measurement of motor 2 when magnet 5 is a rare earth bonded magnet of which the residual magnetic flux density is 0.7 T (Tesla) and the clearance between magnet 5 and pole base portion 3d is 0.3 mm (millimeter).

As is obvious from FIG. 5, the EMF also increases along with the increase of area ratio (S/A) until the area ratio (S/A) reaches 4.8. On the other hand, when the area ratio (S/A) exceeds 4.8, the variation of EMF is very slight as against the variation of area ratio (S/A).

That is, when the area ratio (S/A) satisfies the requirement of 4.8>(S/A) in the configuration, the EMF increases along with the increase of magnet opposed area S as shown in FIG. 5. On the other hand, when the area ratio (S/A) is 4.8<(S/A), the EMF is very slight in variation even in case magnet opposed area S becomes increased. This is because the increased magnetic flux is hard to pass through the magnetic pole due to magnetic saturation of the magnetic pole. Therefore, when it becomes magnetically saturated, the driving force cannot be greatly increased by increasing magnet opposed area S or by increasing the magnets used. In other words, when magnetic saturation is occurred, the rotational torque will not increase even with the power applied to coil 6 increased, and the driving efficiency that is the torque output to the applied power becomes worsened. Also, in case of magnetic saturation of the magnetic pole, iron loss increases, thereby resulting in worsening of the driving efficiency.

As described above, when extended portion 3b is included in the configuration, the opposed area with respect to magnet 5 positioned in the direction of outer periphery becomes increased, and the magnetic flux flowing into the magnetic pole can be increased. Further, when the range of the area ratio (S/A) is 4.8>(S/A), magnetic saturation caused due to excessive increase of the magnetic flux inflow from magnet 5 can be avoided and it is possible to suppress the remarkable increase of iron loss. Consequently, it is possible to reduce the motor loss and to enhance the driving efficiency.

As described above, motor 2 is configured so that the area ratio (S/A) satisfies the requirement of 4.8>(S/A). Accordingly, no magnetic saturation is generated in the magnetic circuit connected to the magnetic pole, thereby enhancing the driving efficiency, and it is possible to realize higher efficiency and less consumption of power.

Figure 6:
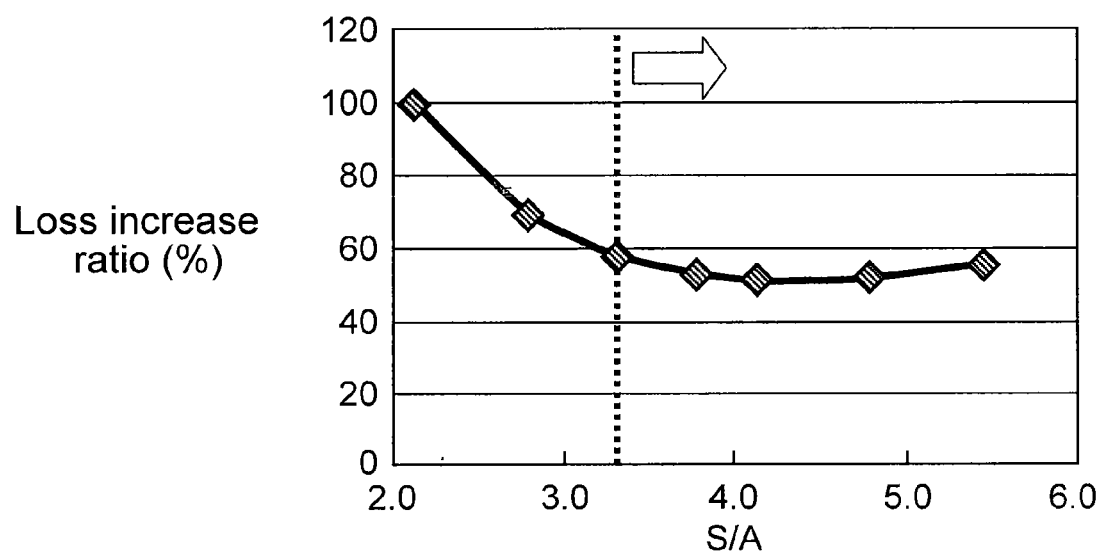
FIG. 6 is a diagram showing the variations of area ratio (S/A) and loss in the preferred embodiment 1 of the present invention.

FIG. 6 is a diagram showing the variations of area ratio (S/A) and loss in motor 2. The horizontal axis shows the area ratio (S/A), and the vertical axis shows the loss increase ratio. As to loss increase ratio, the loss corresponds to reference percent 100% when area ratio (S/A) is 2.2 the same as in the case of FIG. 5. Also, as to motor 2 used in the measurement, the same as in the case of FIG. 5, magnet 5 is a rare earth bonded magnet of which the residual magnetic flux density is 0.7 T and the clearance between magnet 5 and pole base portion 3d is 0.3 mm.

As is obvious from FIG. 6, when area ratio (S/A) is smaller than 3.3, the loss becomes increased as the area ratio (S/A) is decreased. On the other hand, when area ratio (S/A) exceeds 3.3, the variation of loss becomes very slight as against the variation of area ratio (S/A), keeping a state of least loss.

Thus, when area ratio (S/A) is 3.3<(S/A), the motor loss can be reduced as shown in FIG. 6. This is because, when magnet opposed area S is increased, iron loss increases due to increase of magnetic flux, and on the other hand, copper loss decreases due to increase of EMF, and as a result, the decrease of copper loss cancels out the increase of iron loss, thereby optimizing the loss and decreasing the total loss.

Iron loss is the total loss of hysteresis loss and eddy current loss. Particularly, the iron loss is in a proportional relation with magnetic flux density and rotating speed (rpm), and in the case of same rotating speed, the iron loss increases with increase of the magnetic flux density. On the other hand, copper loss is a loss generated in the copper wire due to coil resistance when current flows in the coil. Particularly, in the case of same torque, copper loss is greater when the level of current flowing in the coil is higher.

That is, with extended portion 3b disposed and with magnet opposed area S increased, as in the present preferred embodiment, it is easier to take in magnetic flux from magnet 5, and the magnetic flux density increases, causing the iron loss to increase as well. However, as shown in FIG. 5, as magnet opposed area S is increased, the EMF also increases. And, when EMF becomes higher, it causes the torque to increase, and in the case of same torque, the current flowing in the coil can be reduced, resulting in decrease of copper loss. As a result, looking at the total loss of iron loss and copper loss, when the area ratio (S/A) is smaller than 3.3, copper loss becomes dominant, and the loss caused due to copper loss increases according to the decrease of area ratio (S/A). Contrarily, when area ratio (S/A) is higher than 3.3, the reduction of copper loss acts to suppress the increase of iron loss, then the loss becomes nearly constant as shown in FIG. 6.

Thus, when area ratio (S/A) exceeds 3.3, the loss of motor 2 is decreased, and the driving efficiency can be enhanced.

As described above, when area ratio (S/A) is smaller than 4.8 and larger than 3.3, it is possible to optimize the driving efficiency. That is, in motor 2 described above, it is intended to enhance the driving efficiency by adjusting the length of upward and downward extensions of extended portion 3b so that the area ratio (S/A) is 3.3<(S/A)<4.8 where the upper limit is 4.8 and the lower limit is 3.3.

More specifically, it is preferable to adopt the following configuration. Firstly, as described above, in the case of a 12-pole common magnetic pole having no extended portion 3b, it is desirable that the area ratio (S/A) be in a range from 2.0 to 2.3. Accordingly, magnet opposed area Sd of pole base portion 3d is to be 2.2 times the sectional area A (=2.2×A). Then, to make the range of area ratio (S/A) to 3.3<(S/A)<4.8, the range of magnet opposed area Sb of extended portion 3b is to be (1.1×A)<Sb<(2.6×A). That is, to describe it simply, the range of total area Sb of upper and lower extended portions 3b is preferable to be (0.5×Sd)<Sb<(Sd) so that it exceeds the half of area Sd of pole base portion 3d and is less than area Sd. Further, when pole base portion 3d and extended portion 3b are equal in length in the circumferential direction, it is preferable to make the total length of upper and lower extended portions 3b in the upward and downward directions longer than the length of the half of pole base portion 3d and less than the length of pole base portion 3d.

Also, in the above description, motor 2 is mentioned as an example in which magnet 5 is a rare earth bonded magnet of which the residual magnetic flux density is 0.7 T and the clearance between magnet 5 and pole base portion 3d is 0.3 mm. However, magnetic saturation is for example generated because of excessive magnetic flux inflow from magnet 5 to magnetic pole 5a, and therefore, the saturation varies depending upon the strength of magnet 5 and the distance between magnet 5 and pole base portion 3d. That is, with the strength of magnet 5 lowered or the distance between magnet 5 and pole base portion 3d increased, the magnetic flux inflow to magnetic pole 5a is reduced, causing the upper limit of area ratio (S/A) described above to become larger. For such a reason, substantially, it can be simplified such that the upper limit of area ratio (S/A) is in reverse proportion to residual magnetic flux density Br of magnet 5 and in proportion to distance D between magnet 5 and pole base portion 3d.

Here, as described above, when the residual magnetic flux density of magnet 5 is 0.7 T and the clearance between magnet 5 and pole base portion 3d is 0.3 mm, the upper limit of area ratio (S/A) is 4.8. And, the upper limit of area ratio (S/A) is in reverse proportion to residual magnetic flux density and in proportion to clearance distance. In this way, upper limit Ru of area ratio (S/A) can be generalized as shown by (formula 1).

$$Ru=4.8\times(0.7/Br)\times(D/0.3)=11.2\times(D/Br) \quad \text{(formula 1)},$$

where Br (T) is the residual magnetic flux density of magnet 5, and D is the distance (mm) between magnet 5 and pole base portion 3d. Similarly, lower limit Rb of area ratio (S/A) can be obtained by (formula 2).

$$Rb=3.3\times(0.7/Br)\times(D/0.3)=7.7\times(D/Br) \quad \text{(formula 2)}.$$

Thus, when motor 2 is provided with magnet 5 of which the residual magnetic flux density is Br, and the magnet 5 and pole base portion 3d are opposed to each other via clearance of distance D, it is preferable that the upper limit of area ratio (S/A) is 11.2×(D/Br) and the lower limit thereof is 7.7×(D/Br). That is, it is possible to enhance the driving efficiency by adjusting the length of upward and downward extensions of extended portion 3b so that area ratio (S/A) is in a range of 7.7×(D/Br)<(S/A)<11.2×(D/Br).

In the above description, an outer rotor type brushless DC motor is mentioned as an example, but the present invention can be applied to an inner rotor type brushless DC motor.

Also, in the above description, an example of rare earth bonded magnet is mentioned as a magnet disposed in the rotor, but it is allowable to adopt a ferrite magnet or other permanent magnet.

Preferred Embodiment 2

Figure 7:
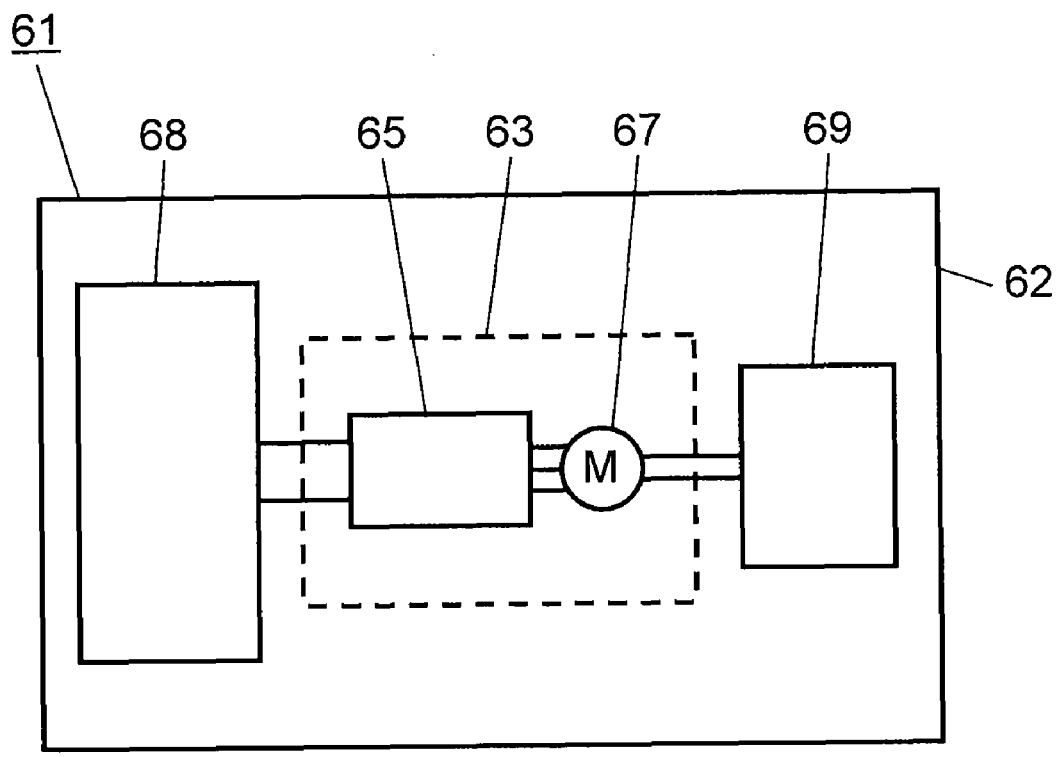
FIG. 7 is a schematic configuration of an example of electronic apparatus in the preferred embodiment 2 of the present invention.

FIG. 7 is a diagram showing the schematic configuration of an example of electronic apparatus using a motor of the present invention. In FIG. 7, an electronic apparatus 61 includes a casing 62 that functions as a main body case, a motor 67 mounted inside the casing 62, a driving unit 65 for driving the motor 67, a power source 68 for supplying electricity to the driving unit 65, and a load (driven member) 69 such as a mechanism portion that is driven using the motor 67 as a power source. Here, the motor 67 and the driving unit 65 constitute a motor drive apparatus 63. The motor 67 is driven by electrical power supplied from the power source 68 via the driving unit 65. A rotational torque is transmitted via the driving shaft of the motor 67 to the load 69. The motor 2 of the present invention can be used as the motor 67.

For example, a laser printer can be given as an example of the electronic apparatus 61. In this case, a paper feed roller corresponds to the load 69. The motor 2 of the present invention shown in FIG. 1 may be mounted together with various electronic components on the wiring board 1 that is horizontally provided in a main body case of the laser printer. In the motor 2, a gear (not shown) can be fixed to a lower portion of the driving shaft 8 that passes through the wiring board 1 and extends downward, and this gear and a gear provided at the paper feed roller can be coupled to each other via a gearbox (not shown) functioning as a deceleration mechanism. The motor 2 of the present invention has a high driving efficiency, and, thus, a laser printer can be realized that can feed paper efficiently.

According to the present invention, it is possible to provide an outer rotor-type motor that has an improved driving efficiency. Thus, the present invention is preferable, for example, for a motor that is used in electronic apparatuses such as laser printers, laser copiers, and the like. Here, the motor of the present invention is not limited to these, and can be used widely as a motor that is required to have a high driving efficiency.

What is claimed is:

1. A motor comprising:
a stator with a plurality of magnetic poles circumferentially arranged at first spaced intervals;
a rotor rotatably arranged in a position opposing to the stator; and
magnets arranged at second spaced intervals circumferentially on a surface of the rotor,
wherein the stator is formed by laminating plate materials,
a plurality of laminated plate materials at least including outermost layers of a laminated body thereof are bent in a direction substantially parallel to the magnet in order to form extended portions, and
when a magnet opposed area of a pole tip portion being closest to a magnet including the extended portion is S, and a smallest sectional area of the plurality of magnetic poles is A, then area ratio (S/A) satisfies a requirement of 4.8>(S/A).

2. The motor of claim 1, wherein the area ratio (S/A) further satisfies a requirement of 3.3<(S/A).

3. The motor of claim 1, wherein the magnet used is a rare earth magnet.

4. The motor of claim 1, wherein the magnet used is a ferrite magnet.

5. An electronic apparatus having the motor of claim 1, comprising:
a main body case,
a driven component disposed in the main body case, and
the motor.

6. The electronic apparatus of claim 5, wherein a wiring board is disposed in the main body case, the motor is mounted on the wiring board, and a magnetic detector element is disposed on the wiring board in such manner as to be opposed to the magnet of the motor.

7. A motor comprising:
a stator with a plurality of magnetic poles circumferentially arranged at first spaced intervals;
a rotor rotatably arranged in a position opposing to the stator; and
magnets arranged at second spaced intervals circumferentially on a surface of the rotor,
wherein the stator is formed by laminating plate materials,
a plurality of laminated plate materials at least including outermost layers of a laminated body thereof are bent in a direction substantially parallel to the magnet in order to form extended portions, and
when a magnet opposed area of a pole tip portion being closest to a magnet including the extended portion is S, and a smallest sectional area of the plurality of magnetic poles is A, then area ratio (S/A) satisfies a requirement of 3.3<(S/A).

* * * * *